United States Patent [19]

Cronce et al.

[11] Patent Number: 5,511,708
[45] Date of Patent: Apr. 30, 1996

[54] ADJUSTABLE CROSSBAR FOR ARTICLE CARRIER

[75] Inventors: Gary M. Cronce, Port Huron; Craig A. Stapleton, Rochester Hills, both of Mich.

[73] Assignee: Advanced Accessory Systems L.L.C., Port Huron, Mich.

[21] Appl. No.: 136,671

[22] Filed: Oct. 15, 1993

[51] Int. Cl.⁶ .................................................. B60R 9/00
[52] U.S. Cl. ............................................ 224/321; 224/326
[58] Field of Search .................................... 224/321, 309, 224/315, 319, 325, 326, 329, 330, 331

[56] References Cited

U.S. PATENT DOCUMENTS

| | | | |
|---|---|---|---|
| 4,770,329 | 9/1988 | Kamaya | 224/331 |
| 4,778,092 | 10/1988 | Grace | 224/331 |
| 5,104,018 | 4/1992 | Dixon | 224/321 |
| 5,201,911 | 4/1993 | Lee | 224/309 |
| 5,203,483 | 4/1993 | Cucheran | 224/326 |
| 5,226,570 | 7/1993 | Pedrini | 224/321 |
| 5,275,320 | 1/1994 | Duemmler | 224/321 |

FOREIGN PATENT DOCUMENTS

| | | |
|---|---|---|
| 2531668 | 2/1984 | France . |
| 2583357 | 12/1986 | France .................... 224/309 |
| 3104163 | 9/1982 | Germany . |
| 8913601 | 1/1990 | Germany . |
| 4223899 | 1/1994 | Germany . |

Primary Examiner—Linda J. Sholl
Attorney, Agent, or Firm—Brooks & Kushman

[57] ABSTRACT

An article carrier comprises a crossbar to be detachably engaged with carrier rails secured to a motor vehicle body panel. The longitudinal rails may be aligned to correspond with style lines of the body panel and need not be aligned parallel to each other in order to receive the crossbar. The crossbar includes an elongated rail carrying at least one slider, the slider having an end removably engageable with the longitudinal rail. A guide carries the slider along an elongated rail of the crossbar while a latch fixedly locates the position of the slider along the elongated rail of the crossbar. In addition, a lock retains the latch in an engaged position to restrict manual operation of the latch. In the preferred embodiment, the longitudinal rails include a track adapted to accommodate correspondingly conforming ends on the slider.

17 Claims, 2 Drawing Sheets

ADJUSTABLE CROSSBAR FOR ARTICLE CARRIER

TECHNICAL FIELD

The present invention relates generally to article carriers mounted on motor vehicle body panels, and more particularly to such article carriers having displaceable crossbars attached to spaced, adjacent longitudinal rails.

BACKGROUND ART

Article carriers that are secured to exterior motor vehicle body panels to improve the cargo capacity of a motor vehicle are quite popular. Generally, the article carriers comprise a pair of rails that support or carry a pair of crossbars. The ends of the crossbars are secured to the rails which, in turn, are mounted directly to the vehicle body panel. However, such article carriers having fixedly positioned crossbars have limited utility in that they may not be adjusted for tight engagement of particularly shaped cargo, and additional restraints must be provided for securing the cargo to the article carrier.

In some motor vehicle markets, it has been known to provide the longitudinal rails as part of the finished body trim on the body panels. In such an instance, the crossbars are often available as options that may be purchased separately from the vehicle if the utility of an article carrier is desired by a customer. With these racks, the crossbars are particularly sized for the spacing between the rails on a particular vehicle installation. The ends of each crossbar are particularly adapted for attachment to a particularly sized rail spacing matched to a particularly sized vehicle body panel. As a result, the crossbars are not interchangeable between the various article carriers. Moreover, such crossbars are useable only where the longitudinal rails are aligned in the parallel arrangement, and would not fit an article carrier where the alignment of the rails is not parallel, for example, where the rails are aligned to match a particularly configured body panel or styling line.

SUMMARY OF THE PRESENT INVENTION

The present invention overcomes the above-mentioned disadvantages by providing a crossbar that can be connected to spaced, adjacent rails regardless of the width or relative alignment between the rails. Moreover, the present invention provides an article carrier which can be configured to match the styling of the particular vehicle body panels without limiting crossbars to a fixed orientation relative to the rails.

In general, the crossbar comprises an elongated rail with at least one slider removably engageable with the longitudinal rail. A slider includes an end removably attachable to the longitudinal rail. As used herein, the term longitudinal rail refers to any vehicle mounted support rails regardless of their precise relationship to a longitudinal axis of the vehicle or body panel. A guide, preferably part of the elongated rail, slidably carries a slider along a portion of the elongated rail, while a latch carried by the slider fixedly locates the position of the slider along the elongated rail. Nevertheless, the guide may also be formed on the slider while the rail carries a follower as discussed in greater detail later. Preferably, a lock for selectively locking the latch in the fixed locating position protects the crossbar from unintended removal from the motor vehicle carrying the longitudinal rails.

The preferred guide carried by the elongated rail includes a continuous track along this elongated rail and the slider has a track follower. Moreover, preferably two sliders are employed with each elongated, crossbar longitudinal rail so that the rail may be symmetrically adjusted with respect to the longitudinal rails.

Preferably, the detachable end of each slider also includes a follower adapted to engage a track on the longitudinal rail. Preferably, the track comprises a channel having a restricted opening along the longitudinal rail, and a portion of the end of the slider includes a protrusion which is entrained within the channel. Preferably, the end also includes a second protrusion which may be engaged in a plurality of recesses spaced along the longitudinal rail track so as to fixedly position the crossbar along the track of the longitudinal rail. In the preferred embodiment, the first and second protrusions are spaced apart from each other for free movement of the slider along the restricted opening of the track.

As a result, it will be understood that with the latch disengaged, the slider is movable to a position along the elongated rail as the crossbar is simultaneously slid along the longitudinal rail. Accordingly, the crossbar may be displaced along the longitudinal rails even though the longitudinal rails are not aligned parallel to each other.

The present invention permits original equipment manufacturer installation of longitudinal rails to the vehicle without limiting customer choice to purchase a particularly sized crossbar in order to fit the article carrier. Rather, a crossbar constructed according to the present invention may be used with article carriers having a different spacing as well as carriers having changing spacing between the longitudinal rails. As a result, a single crossbar may be employed with a wide variety of motor vehicle article carriers, even though the longitudinal rails are installed as original equipment to conform with the shape, size or styling of the vehicle body panels to which they are mounted. Furthermore, the present invention provides an article carrier crossbar which may be sold separately from the longitudinal rails of the carrier but which can be locked to the longitudinal rails to avoid unauthorized removal. Furthermore, the present invention provides an adjustable crossbar which can be fixedly secured in position regardless of the spacing between the longitudinal rails or the alignment between the rails.

BRIEF DESCRIPTION OF THE DRAWING

The present invention will be more clearly understood by reference to the following detailed description when read in conjunction with the accompanying drawing in which like reference characters refer to like parts throughout the views and in which.

DETAILED DESCRIPTION OF THE PREFERRED EMBODIMENT

Figure 1:
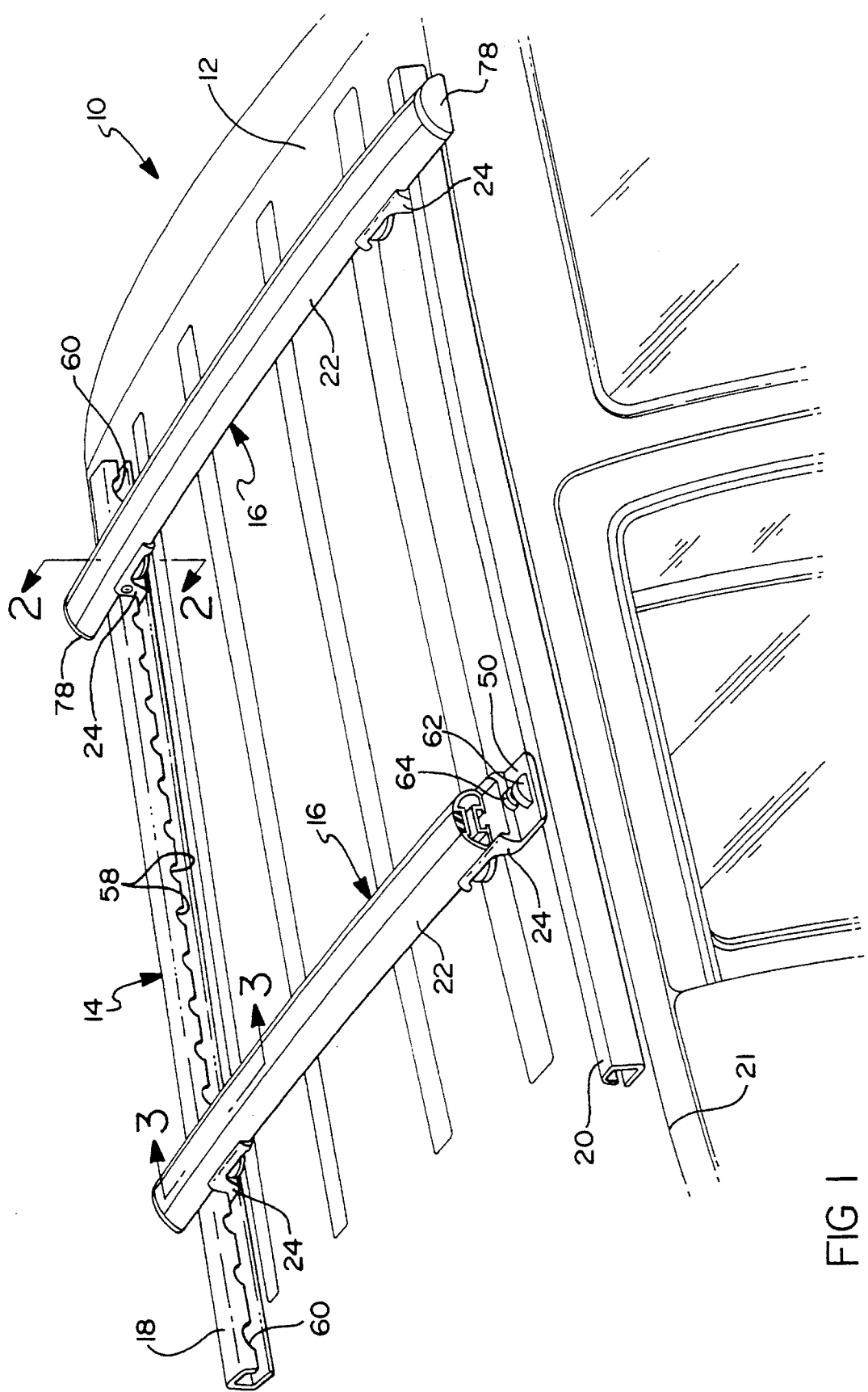
FIG. 1 is a perspective view of an article carrier with crossbars constructed in accordance with the present invention and mounted on a motor vehicle.

Referring first to FIG. 1, motor vehicle 10 is shown with a roof panel 12 supporting an article carrier 14 including crossbar 16 according to the present invention. Two crossbars 16 are shown in FIG. 1 carried by longitudinal rails 18 and 20 mounted to the roof panel 12 of motor vehicle 10. Mounting of the longitudinal rails 18 and 20 may be done in a conventional manner such as by rivnuts and screws or adhesives. However, unlike previously known longitudinal rails for article carriers, the rails 18 and 20 need not be aligned parallel to each other in order to support the adjustable crossbar 16 according to the present invention. In particular, although the rails, for example rail 20, may be aligned to correspond with the orientation of the styling line 21 at the edge of the roof panel 12, the article carrier 14 is not limited to permanent or fixed position crossbars. Rather, the longitudinal rails may be oriented in a non-parallel alignment. Nevertheless, the crossbars 16 carry movable sliders with ends detachable from the longitudinal rails so that the crossbar may be secured at many positions along the longitudinal rails while being fixedly positioned with respect to both of the longitudinal rails.

Figure 2:
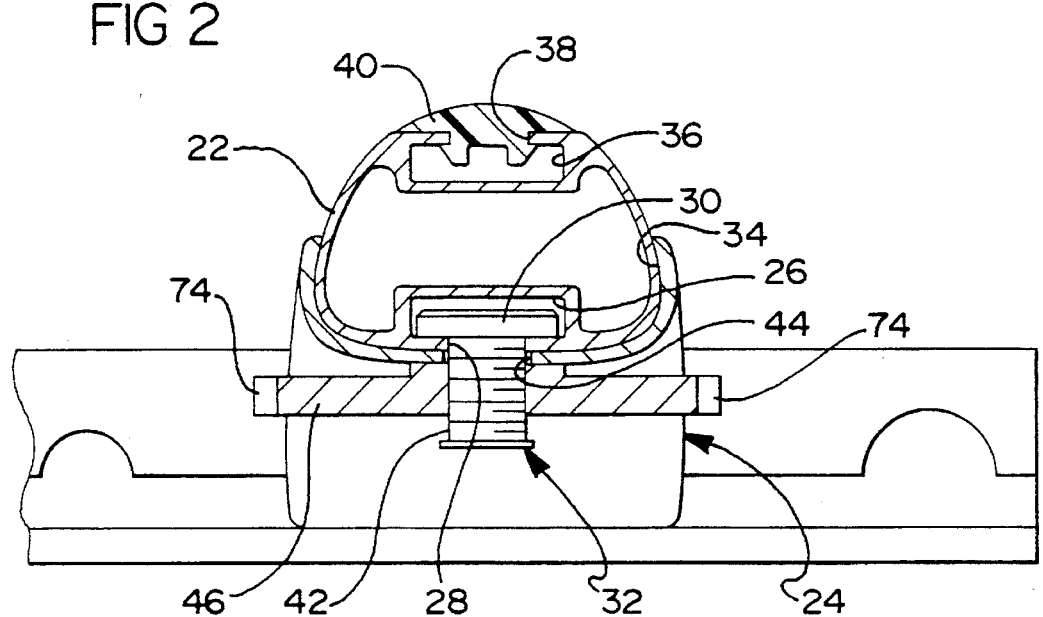
FIG. 2 is an enlarged, fragmented sectional view taken substantially along the line 2—2 in FIG. 1.

Each crossbar comprises an elongated rail 22 and at least one slider 24. As shown in FIGS. 1 and 2, the elongated rail 22 preferably comprises an extruded tubular member, although roll form and other rail constructions are applicable. An end cap 78 covers each open end of the roll 22 to provide a conforming exterior shape and engagement with the interior of the rail. At least one of the elongated rail and the slider include a guide for slidably carrying the slider along a portion of the elongated rail. The guide may be carried by either or both of the components. In particular, as best shown in FIG. 2, the extruded rail includes a track in the form of an elongated channel 26 with a restricted opening 28. An enlarged head 30 of a fastener 32 serves as a track follower, and is carried by the slider 24 as will be described in greater detail below. Conversely, the slider 24 also includes an elongated recess 34 conforming with the exterior shape of elongated rail 16 so as to provide another track and track follower arrangement between the slider 24 and the elongated rail 22. Regardless of whether the guide is carried by the rail or the slider, the position of the slider is adjustable along at least a portion of the elongated rail 22. The elongated rail 22 also includes an upper channel 36 having a restricted opening 38 adapted to receive a resilient support member, for example, a plastic or rubber insert 40.

The slider 24 carries a latch for fixedly positioning the slider 24 along the elongated rail 22. In the preferred embodiment, the fastener 32 includes a threaded body 42 received through an opening 44 in the slider 24. A correspondingly threaded nut in the form of or carried by a radially enlarged knob 46 retains the fastener 32 in the opening 44 and can be used to tighten the rail 22 against the slider 24 in order to fix the position of the slider 24 with respect to the elongated rail 22. In the preferred embodiment, where the guide is continuous along the entire length of the elongated rail 22, each slider 24 may be positioned anywhere along the length of the elongated rail 22 and latched to fixedly retain that position.

Figure 3:
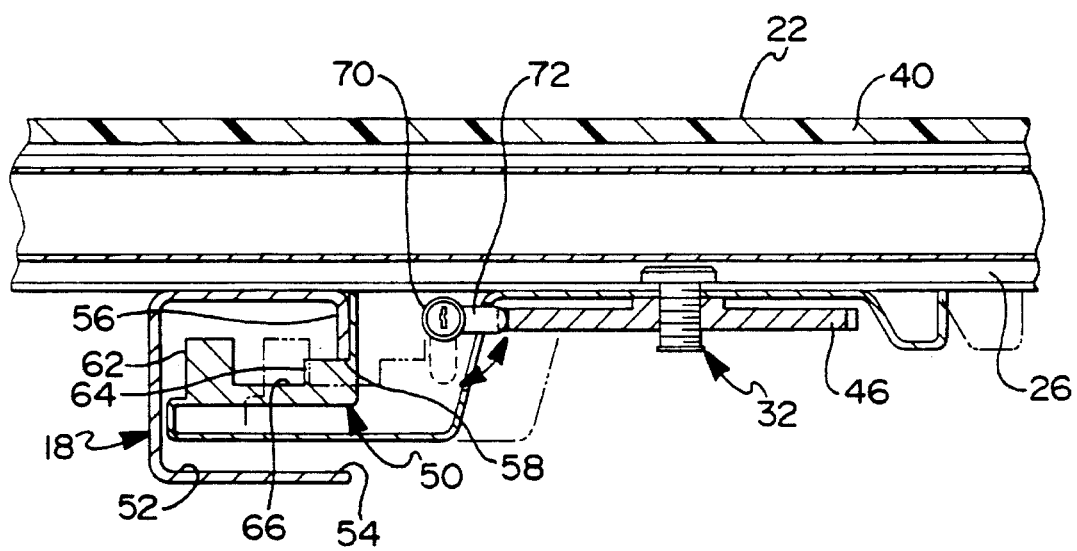
FIG. 3 is an enlarged, fragmented sectional view taken substantially along the line 3—3 in FIG. 1.

In addition, each of the sliders 24 can removably engage the longitudinal rails 18 and 20. In particular, as best shown in FIGS. 1 and 3, each slider has an end 50 detachably engageable with each elongated rail 18 or 20. Each longitudinal rail includes a track in the form of a channel 52 adapted to receive a track follower configuration of the end 50. The track channel 52 includes a restricted opening 54, the restriction being formed by depending flange 56 at one end of the opening 54. The flange 56 includes a plurality of recesses 58. At least one recess, but preferably two recesses 60 one at each end of each rails 18, 20 has a larger radius than the recesses 58. The end 50 of the slider 24 includes a first protrusion 62 extending above the height of the recess 58 so that a portion of the end 50 remains entrained within the channel 52 as the elongated rail 22 is slid longitudinally along the longitudinal rail 18. In addition, the end 50 includes a second protrusion 64 spaced apart from the protrusion 62, having an exterior shape adapted to be received within the recesses 58. Thus, with the protrusion 64 extended into the recess 52, slider 24 locks the rail 22 in a fixed longitudinal position along the longitudinal rail 18. The land 66 separating the protrusions 62 and 64 enables the lowermost edge of the flange 56 to avoid obstructing movement of the slider 24 along the length of the longitudinal rail 18. On the other hand, the protrusion 62 is larger than the protrusion 64 and thus remains entrained within the channel 52 unless positioned near, and transversely displaced through, the enlarged recesses 60 shown in FIG. 1 at both ends of rail 18.

In addition, while the knob 46 permits manual securement of the slider 24 in a fixed position with respect to the elongated rail 22, a lock for selectively limiting removal of the crossbar 22 is also a preferred feature of the invention. In the preferred embodiment, the lock is carried by the slider so as to restrict movement of the latch once the latch has been tightened to fix the position of the slider along the elongated rail 22. In the preferred embodiment illustrated, the slider 24 carries a conventional lock cylinder 70 having a displaceable locking arm 72. The arm 72 extends into peripheral recesses 74 spaced around the periphery of the knob 46. The lock cylinder 70 receives a key to limit access and securely lock the crossbar 16 to the longitudinal rails 18 and 20.

Having thus described the important structural features of the preferred embodiment of the present invention, the operation of the apparatus is easily described. In particular, the longitudinal rails 18 and 20 may be secured on the vehicle in a spaced, adjacent relationship, but they need not be positioned parallel to each other. Accordingly, the rails may be attached to correspond with the styling of a particular vehicle body panel, and may be provided by any original equipment manufacturer. In order to improve the utility of the longitudinal rails, crossbars 16 may be provided either individually or in sets to provide crossrails extending across or between the longitudinal rails 18 and 20. Moreover, a crossbar provided with at least one slider 24 as previously discussed permits the crossbar to be latched at any longitudinal position along the longitudinal rails. Preferably, both transverse ends of the crossbar include sliders 24 so that the crossbar can be symmetrically centered over the rails 18 and 20 regardless of the distance between the spaced, adjacent longitudinal rails. On the other hand, it will be understood that only one slider is needed if an end of the crossbar also has an end 50 engageable with the rail. In any event, the slider is displaced inwardly from the longitudinal rail as the crossbar is positioned adjacent an enlarged opening 60 in rail 18. The slider is moved outwardly toward the rail 18 until the end protrusion 62 becomes engaged in the channel 52. The crossbar is displaceable along the longitudinal rails to a desired position without disengagement from the rail 18 with the slider 24 in the position shown in phantom line in FIG. 3.

Once the selected longitudinal position has been reached, the slide 24 is displaced outwardly from the opposite end of the crossbar and into the channel 52 so that the protrusion 64 fits within the conformingly shaped recess in flange 56 to lock the crossbar in a fixed position along the longitudinal rail. Conversely, movement of the slider 24 toward the opposite end of the elongated rail 22 enables the crossbar 16 to be slid along the track of the longitudinal rail 18 until another desirable position has been obtained. Nevertheless, the larger protrusion 62 prevents the end 50 from becoming extracted from the track formed by the channel 52 until the crossbar reaches position in registration with the enlarged installation opening 60, for example, at the end of the longitudinal rail. Nevertheless, when the crossbar has been fixedly positioned with respect to the longitudinal rail, the latch is tightened, for example, by tightening knob 46, to fix the position of the slider 24 with respect to the elongated rail 22. A lock 70 prevents unauthorized removal of the crossbar 16 from the article carrier 14.

Having thus described the present invention, many modifications thereto will become apparent to those skilled in the art to which it pertains without departing from the scope and spirit of the present invention as defined in the appended claims.

What is claimed is:

1. An adjustable crossbar, for article carrier rails with a channel having a restricted opening and having a plurality of recesses, comprising:

an elongated rail;

at least one slider, said slider having an end for restrictedly removable engagement with the article carrier rail, said end having a first protrusion and a second protrusion and said second protrusion dimensioned for being receivable in each of said plurality of recesses in a first position for preventing movement of the crossbar in a longitudinal direction of the rails, and said protrusions being linearly aligned in and adapted to be displaceable to said first position and a second position along a direction perpendicular to said restricted opening, said first protrusion adapted to restrict removal of said end from the channel as said elongated rail is slid along the carrier rail with said end in said second position, and as said slider is displaced along said perpendicular direction so that said second protrusion fits within said recesses in said first position to lock the crossbar in a fixed position along the carrier rail;

a guide for slidably carrying said at least one slider along a portion of said elongated rail;

a latch carried by each said slider for fixedly locating the position of said slider along said elongated rail; and a lock for selectively locking said latch in the fixedly locating position.

2. An adjustable crossbar according to claim 1 wherein said guide is continuous along said elongated rail.

3. An adjustable crossbar according to claim 1 wherein said guide comprises a channel in said rail.

4. An adjustable crossbar according to claim 3 wherein said channel has a restricted opening.

5. An adjustable crossbar according to claim 4 wherein said slider carries a fastener with an enlarged head and wherein said enlarged head is received in said restricted opening.

6. An adjustable crossbar according to claim 5 wherein said fastener has a threaded body.

7. An adjustable crossbar according to claim 6 wherein said fastener extends through a bore in said slider.

8. An adjustable crossbar according to claim 7 wherein said fastener is retained in said bore by a nut threadably engaging said body.

9. An adjustable crossbar according to claim 8 wherein said nut comprises a radially enlarged knob.

10. An adjustable crossbar according to claim 8 wherein said lock includes a protrusion for restricting rotation of said nut.

11. An adjustable crossbar according to claim 1 wherein at least one article carrier rail has a track and wherein said end includes a track follower.

12. The invention as defined in claim 1 wherein the rail opening is a side opening and further comprising said first and second protrusions being aligned in a side-to-side direction.

13. An article carrier comprising:

a pair of spaced, adjacent longitudinal rails;

at least one crossbar having an elongated rail and at least one slider linearly displaceable along said elongated rail of said crossbar, said slider having an end for removable disengagement with said longitudinal rail;

a guide for slidably carrying said at least one slider along a portion of said elongated rail;

a latch carried by each said slider for fixedly locating the position of said slider along said elongated rail; and a lock for selectively locking said latch in the fixedly locating position, wherein at least one longitudinal rail includes a track and wherein said slider includes a track follower, wherein said track comprises a channel, wherein said channel has a restricted opening, and said end includes a first protrusion entrained in said channel, wherein said restricted opening has a plurality of spaced recesses, and said end includes a second protrusion shaped for confinement in each of said recesses in a first position to prevent movement of the crossbar in a longitudinal direction of the rails, and wherein said second protrusion is aligned with said first protrusion in a linear direction perpendicular to said opening said end is movable between said first and a second position in said direction, for restricting extraction of said first protrusion on said end from said channel while said end is displaceable to said first and said second positions in said perpendicular direction, and said crossbar is displaceable along said longitudinal rail with said end in said second position.

14. An adjustable crossbar according to claim 13 wherein said longitudinal rails are not parallel.

15. An adjustable crossbar according to claim 14 wherein said at least one slider comprises two sliders.

16. An adjustable crossbar according to claim 13 wherein at least one of said recesses is sized to receive said first protrusion.

17. The invention as defined in claim 13 wherein each said restricted opening is a side opening and said first and second protrusions are aligned in a side-to-side direction.

\* \* \* \* \*